United States Patent [19]

Fahey et al.

[11] 4,073,382
[45] Feb. 14, 1978

[54] APPARATUS FOR RACKING STEEL AND THE LIKE

[75] Inventors: Thomas D. Fahey; Samuel Schlagel, both of Denver, Colo.

[73] Assignee: Steel Storage Systems, Inc., Commerce City, Colo.

[21] Appl. No.: 763,249

[22] Filed: Jan. 28, 1977

[51] Int. Cl.² .............................................. A47F 5/00
[52] U.S. Cl. ......................................... 211/1; 187/7; 211/151; 214/16.4 A
[58] Field of Search ........................... 211/1, 151, 1.5; 214/16.4 A; 187/7; 312/306

[56] References Cited

U.S. PATENT DOCUMENTS

| | | | |
|---|---|---|---|
| 3,016,973 | 1/1962 | Williamson | 214/16.4 A X |
| 3,485,389 | 12/1969 | Armington et al. | 187/7 X |
| 3,708,074 | 1/1973 | Fahey et al. | 211/151 |
| 3,814,026 | 6/1974 | Maloney | 214/16.4 A X |
| 3,954,185 | 5/1976 | Wentz | 214/16.4 A X |

Primary Examiner—Roy D. Frazier
Assistant Examiner—Robert W. Gibson, Jr.
Attorney, Agent, or Firm—Edwin L. Spangler, Jr.

[57] ABSTRACT

This invention relates to an improved steel racking apparatus characterized by a rack having tiers of open sided drawer-like receptacles on at least one side thereof operable from one end and an elevator on said end that moves up and down while carrying a laterally movable cage positionable to both actuate and observe the loading and unloading of the receptacles. The invention also encompasses the combination which comprises one such elevator equipped rack and at least a second rack without the elevator positioned in spaced relation alongside thereof in position such that the receptacles of both racks opening onto the aisle therebetween can be serviced from the cage.

15 Claims, 13 Drawing Figures

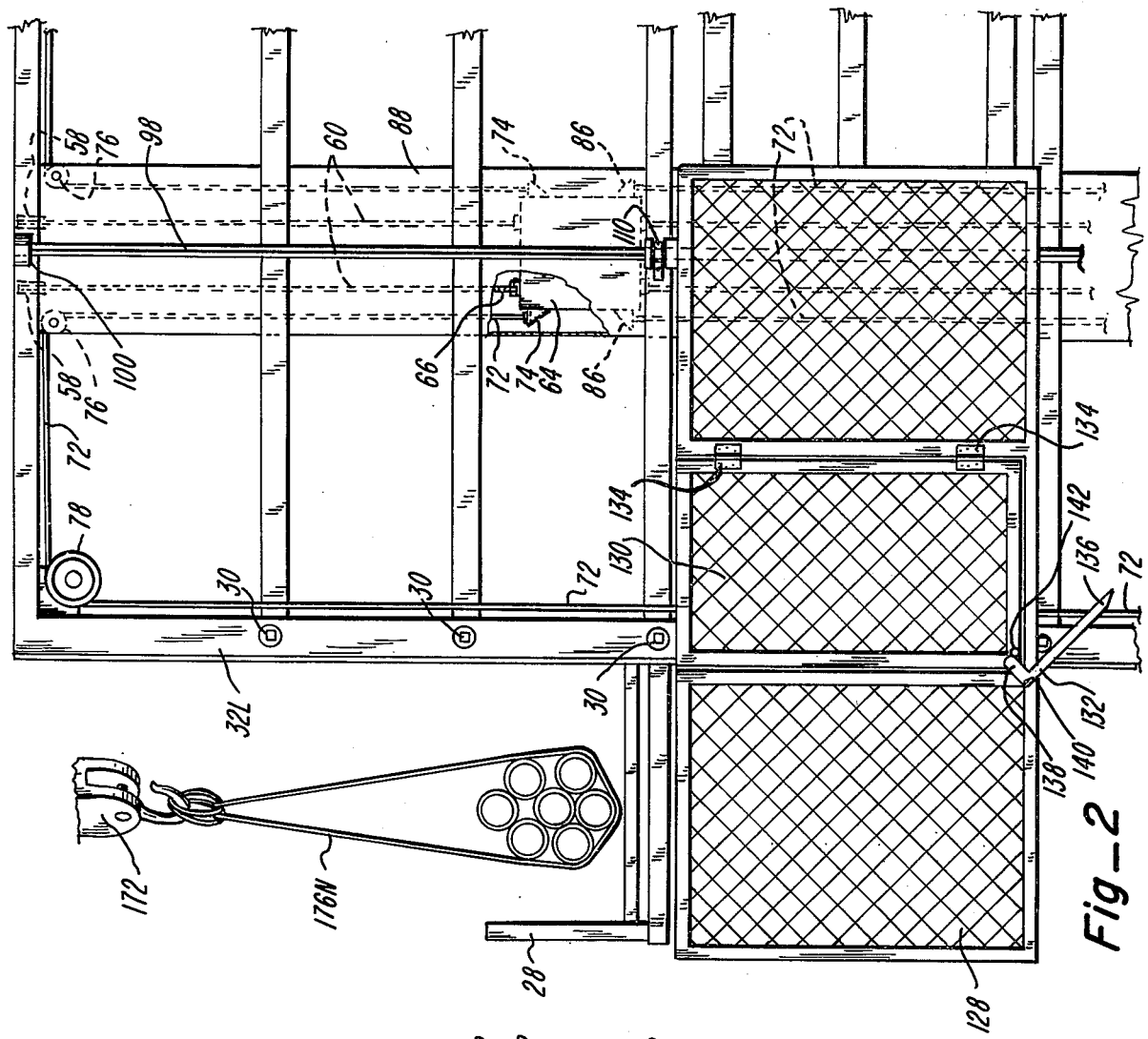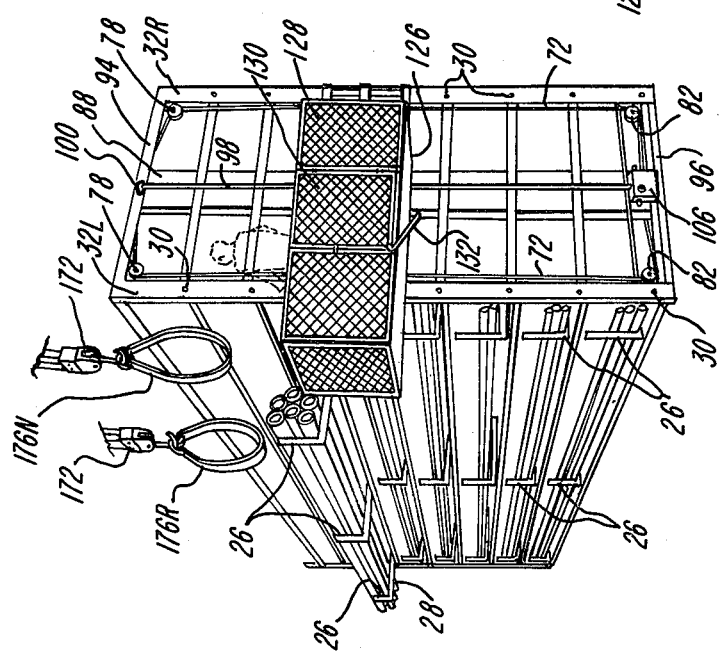

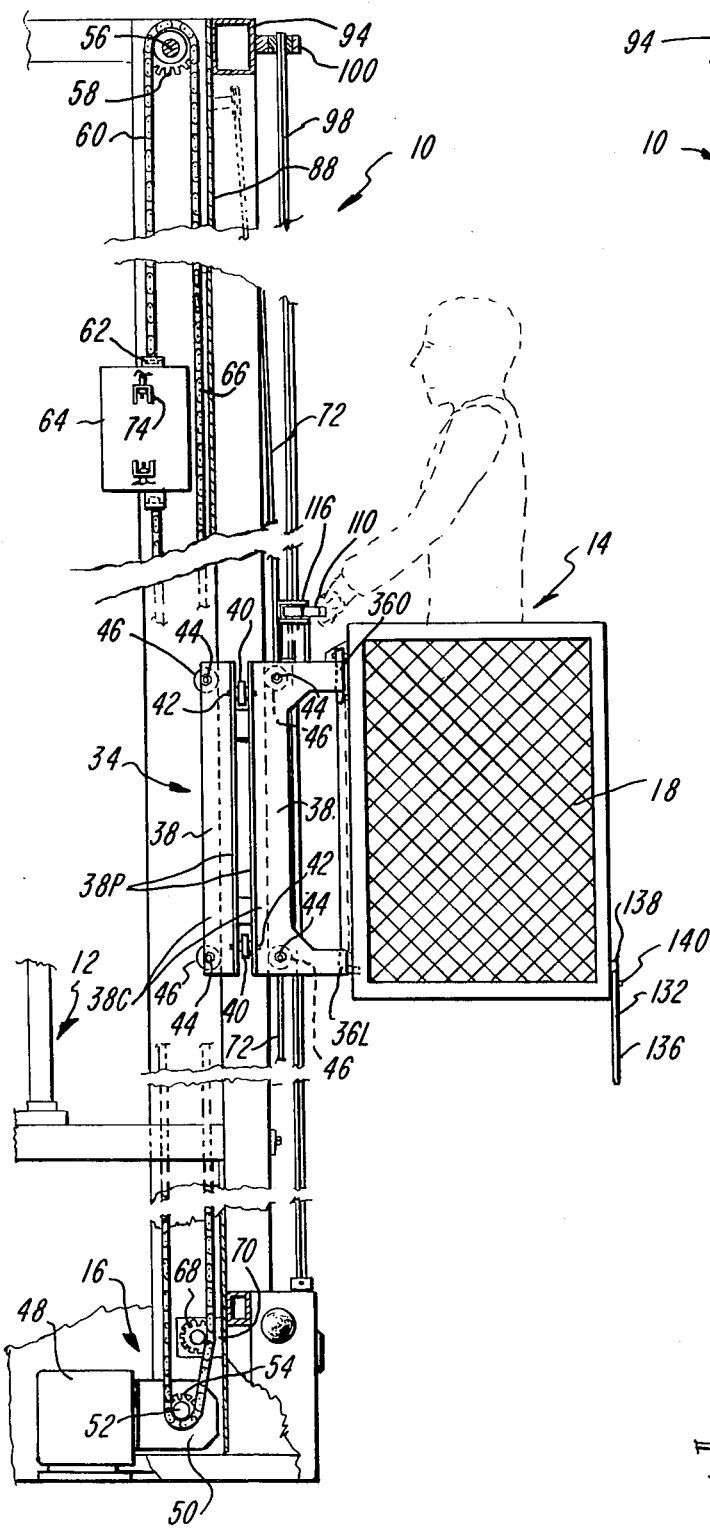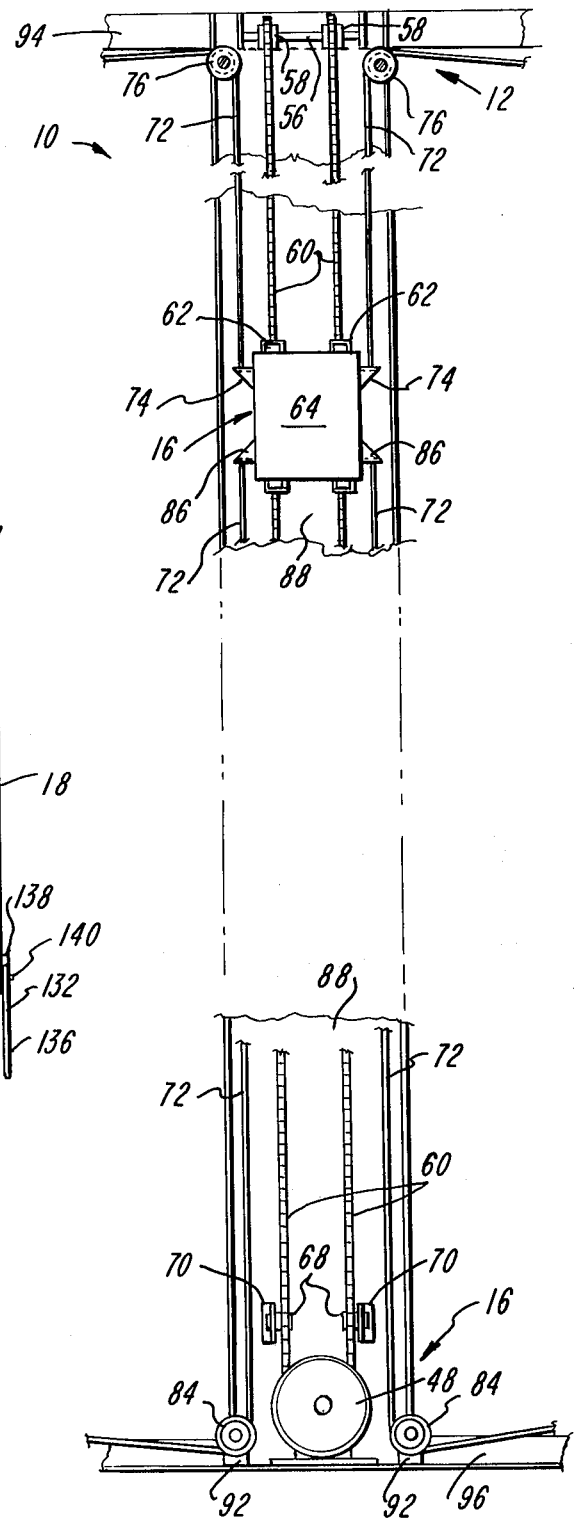
Fig_3   Fig_4

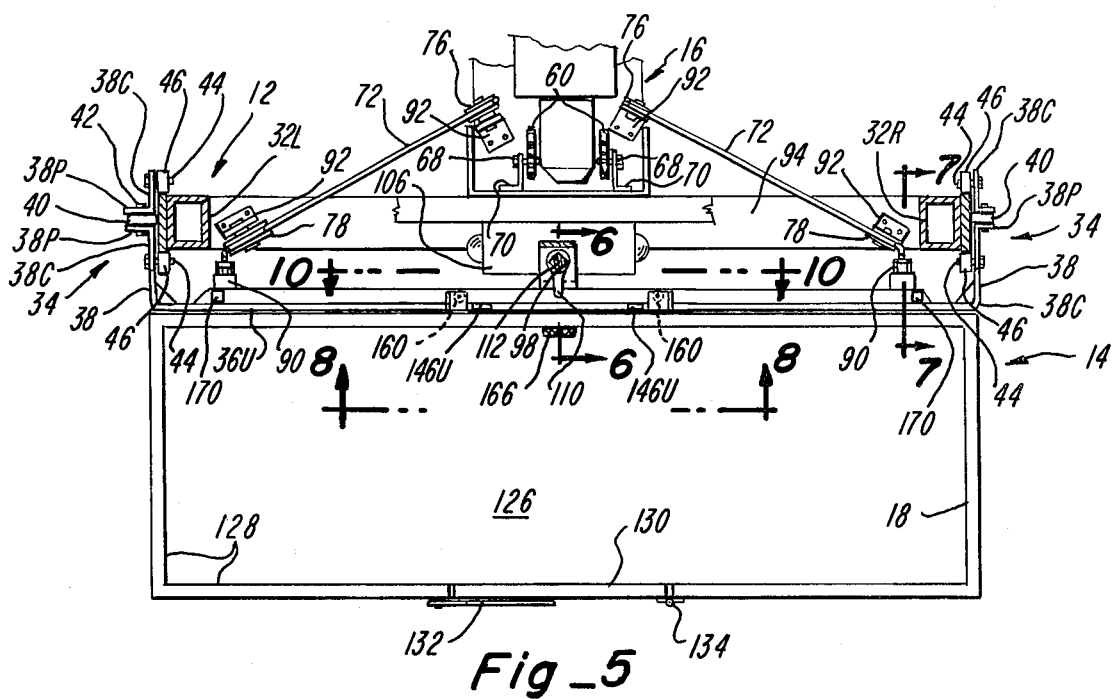
Fig_5
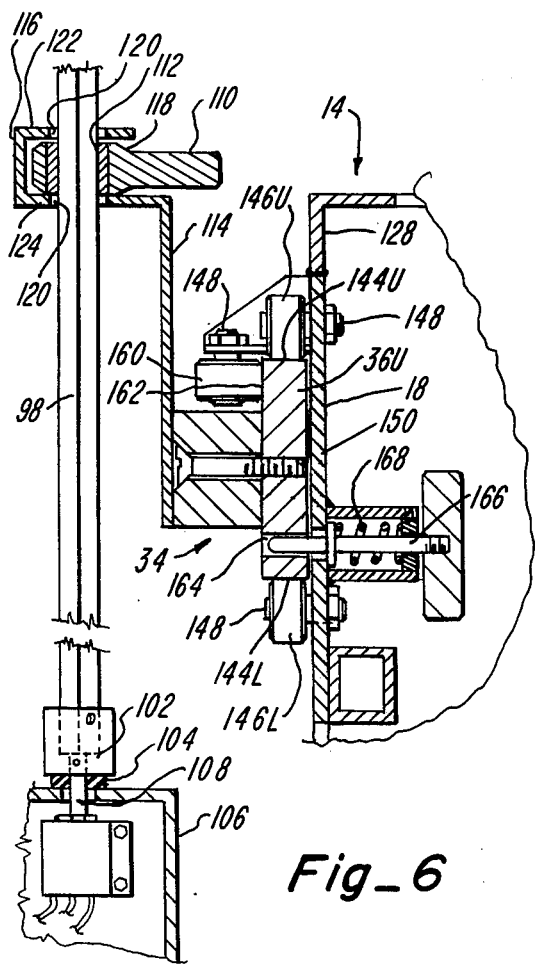
Fig_6
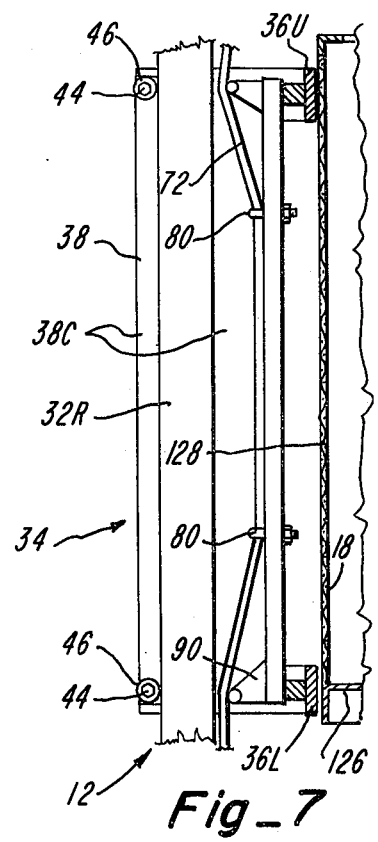
Fig_7

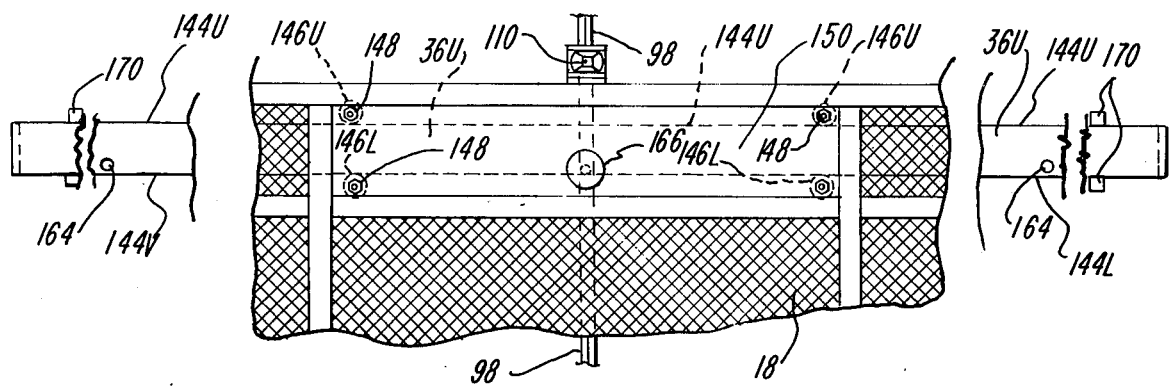
Fig_8
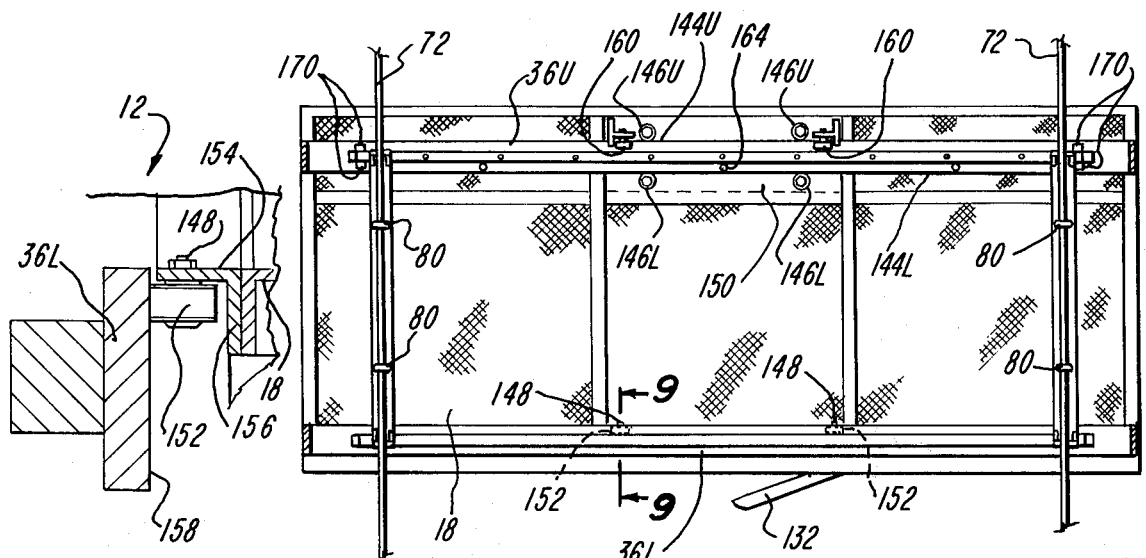
Fig_9
Fig_10

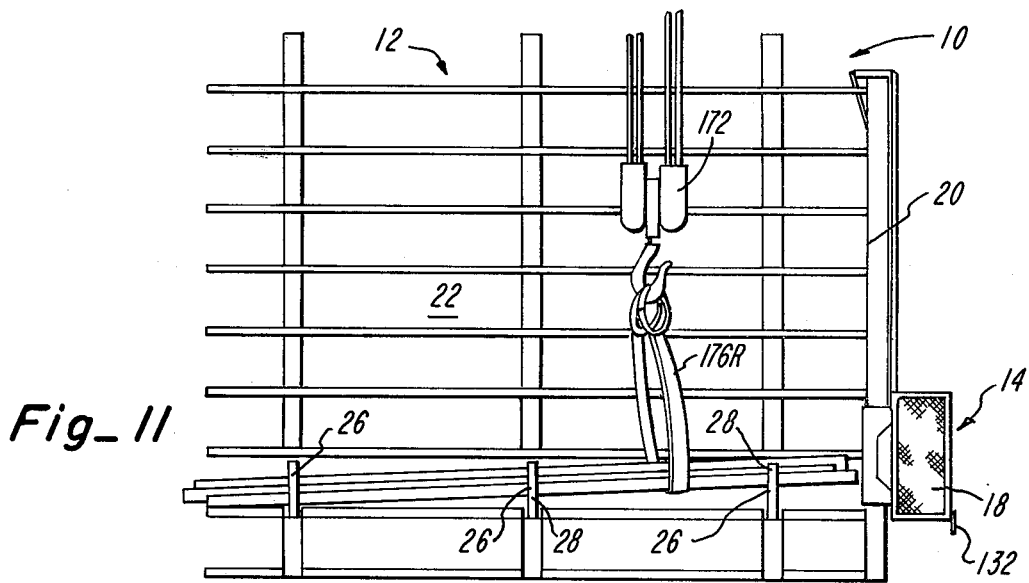
Fig_11
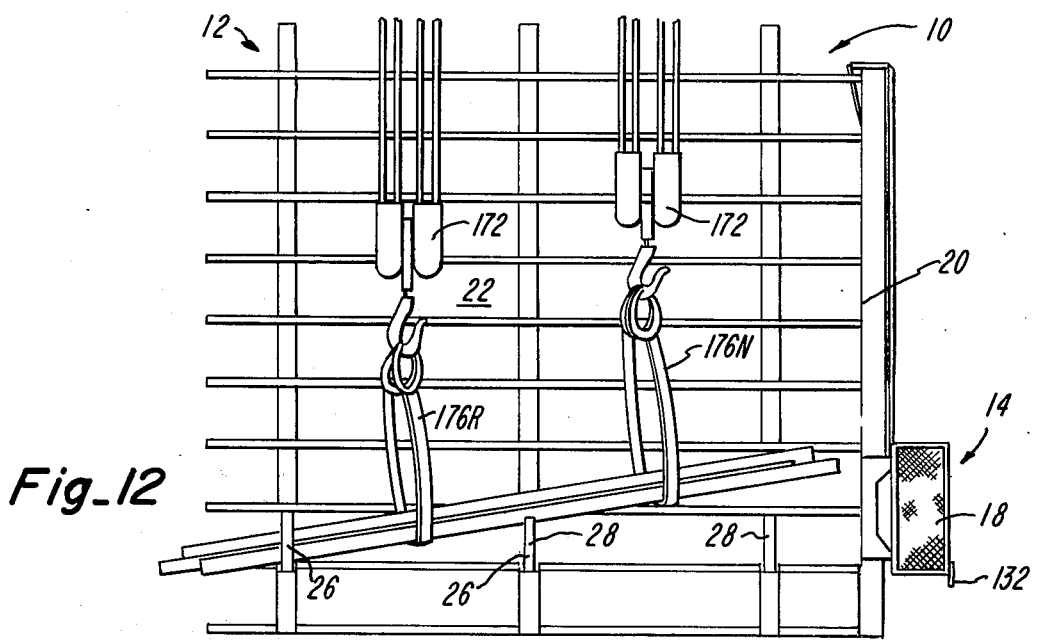
Fig_12
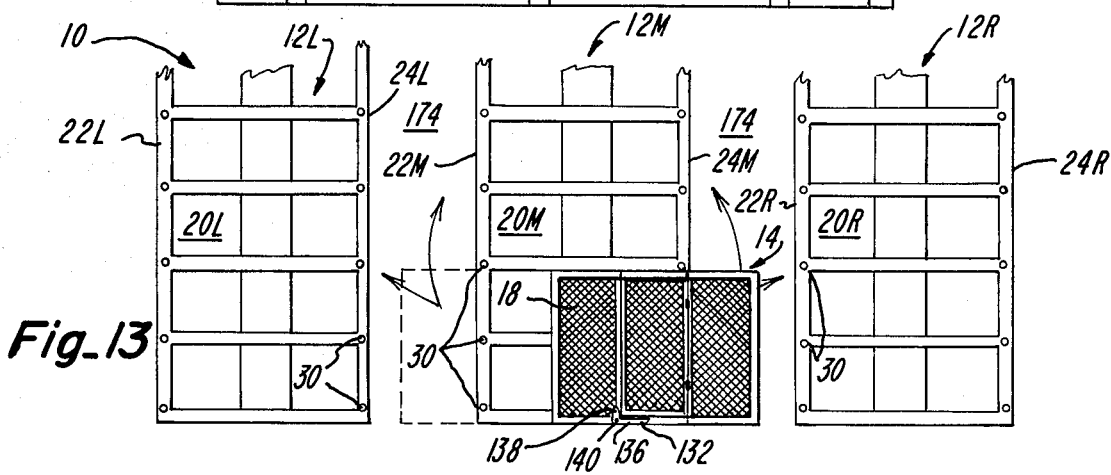
Fig_13

APPARATUS FOR RACKING STEEL AND THE LIKE

Assignee's U.S. Pat. No. 3,708,074 discloses a novel rack for storing steel and the like which includes a series of open sided drawer-like receptacles arranged one above the other in tiered relation within a frame. Drive shafts at each level operative from one end of the frame are used to roll a selected receptacle both in and out. Such shafts are duplicated on both sides of the frame so that the operator is in position to observe not only the movement of the receptacle but the loading and unloading thereof as well.

This rack has proven to be a real time and labor saver to the warehouser and fabricator of steel rods, tubes, sheets and structural shapes to say nothing of the cost savings realized through the more efficient use of floor space. An additional, but nonetheless important, advantage has been the considerable reduction in losses resulting from damage to the stock. Ordinarily one would think that heavy steel beams and the like would be hard to damage, yet their very size and weight plus the manner in which they must be handled is responsible for a good deal of bent tubes and rods, wrinkled sheets and the like that either cannot be used at all or must be cut into smaller sizes with the resulting waste.

It has now been found that, despite the tremendous advantages gained through the use of the rack, it has yet to reach its full potential because, for all practical purposes, it is limited in height to that which the operator standing at ground level can reach and observe. There are many solutions to the problem of getting the operator up to a level where he can both actuate the receptacles and at least observe the loading and unloading thereof such as, for example, ladders, ordinary elevators and self-contained lift mechanisms like lift trucks, so-called "cherry pickers", etc.; however, none of these potential solutions is really the answer. Ladders, for instance, are relatively unsafe to begin with and they are especially unsatisfactory as a means of support while the considerable torque necessary to roll the receptacles in and out is applied to the drive shafts. A single centrally located elevator cannot be used because the operator is unable to see alongside the rack and at least observe what is going on which is essential if the operation is to be carried out safely and with dispatch. Actually, as will appear presently, the operator not only watches the operation but, in most instances, actually does it by means of a hand-held control for a double hook crane that he carries with him in the cage. Conceivably an extra wide cage could be used which would allow the operator to move the required distance from side-to-side but the inordinate expense and complexity of such a set up would make it completely inpractical. Moreover, experience has shown that shifting the load of the operator and his activities to one side or the other of center can result in serious problems unless special precautions are taken.

Self-contained lifts are slow, dangerous and difficult to maneuver in tight quarters. To be practical, the operator must be able to walk to the elevator, raise himself to the desired height, move the cage laterally to the particular side of the rack he is going to use, open the drawer, complete the loading or unloading operation, close the drawer and return to the ground all within only a minute or two more than he would use in performing these same operations standing on the ground or else much of the time saving realized through the use of the rack in the first place is lost. Other savings associated with the improved utilization of space would, of course, remain.

It has now been found in accordance with the teaching of the instant invention that an elevator ideally suited for use in combination with one or more racks of the general type previously noted will include provision for raising the cage as well as moving it from side-to-side. Rail-forming uprights on the end of the rack define a track that guides and retains the cage-carrying frame as it moves up and down. The frame, in turn, defines horizontally disposed rails along which the cage moves during its excursion from side-to-side.

Instead of using the hoisting mechanism to raise and lower the cage-carrying frame directly, it has been found advantageous to use it instead as the means for lifting and lowering a counterweight disposed midway between the rail-forming uprights at the end where the elevator is located. Then, a system of pulleys and cables attached between the counterweight and frame define a pair of closed loop systems that cooperate with one another to transfer the load to the outside edge of the latter and thus stabilize it so that the subassembly which includes the frame and cage carried thereby will not twist or otherwise bind on its vertical track even though the cage is not centered and is shifted all the way to one side or the other.

It is, therefore, the principal object of the present invention to provide a novel and improved elevator for use in combination with one or more steel racks of the general type having tiers of open sided drawer-like receptacles accessible from at least one side thereof.

A second objective is the provision of an elevator of the type aforementioned which is provided with a cage that moves from side-to-side as well as up and down.

Another object of the invention forming the subject matter hereof is the provision of the novel assembly wherein the uprights at one end of the rack constitute rails which cooperate to define a track guiding the cage-carrying frame during its vertical movement.

Still another objective is the provision of a unique elevator rigging wherein the hoisting mechanism is used to raise and lower a counterweight while the counterweight, in turn, raises and lowers the cage-carrying frame through a pair of closed loop systems of pulleys and cables attached to the outboard corners of the latter which maintain it in a stable configuration even though the cage is not centered thereon.

An additional object of the within described invention is to provide an elevator mounted on one rack for vertical movement and also horizontal transverse movement relative thereto and to the near side of at least one other rack alongside the first so as to place the operator in position to both actuate and at least observe the latter.

Further objects are to provide an improved steel racking apparatus which is versatile, efficient, safe, easy to use, fast, reliable, compact, rugged and readily adaptable for use in various and sundry steel warehousing operations.

Other objects will be in part apparent and in part pointed out specifically hereinafter in connection with the description of the drawings that follows, and in which:

FIG. 1 is a perspective view showing the steel racking apparatus of the present invention in use preparatory to unloading tubes from a drawer-like receptacle on the left side six levels above the floor;

FIG. 2 is a fragmentary front end elevation greatly enlarged and with portions broken away to better reveal certain structural details which shows the cage shifted to the left side of its frame in position where an operator therein can both actuate and observe or carry out the unloading operation of FIG. 1;

FIG. 3 is a left side elevation to a slightly smaller scale than FIG. 2, and with portions broken away to conserve space, showing the details of the cage hoist subassembly and controls therefor;

FIG. 4 is a rear elevation of the front end of the apparatus to the same scale as FIG. 3 and, again, having portions broken away to conserve space and showing the cage hoist subassembly from a different location;

FIG. 5 is a top plan view of the front end of the unit to the same scale as FIGS. 3 and 4;

FIG. 6 is an enlarged fragmentary section taken along line 6—6 of FIG. 5, portions of which have been broken away to conserve space, revealing the cage-carrying frame and rails, rolling connection of the cage thereon and the elevator control;

FIG. 7 is an enlarged fragmentary section taken along line 7—7 of FIG. 5 showing the vertical track defined by the corner rail-forming uprights of the rack and the manner in which the cage-carrying frame is mounted for vertical rolling movement therealong;

FIG. 8 is a fragmentary section to approximately the same scale as FIG. 2 taken along line 8—8 of FIG. 5 showing the manner in which the cage is releasably latched in any one of several positions;

FIG. 9 is a fragmentary section to an enlarged scale taken along line 9—9 of FIG. 10 showing the lower cage roller and supporting rail therefor;

FIG. 10 is an enlarged fragmentary section taken along line 10—10 of FIG. 5 showing the manner in which the case is mounted for horizontal rolling movement along the top rail of the cage-carrying frame;

FIG. 11 is a left side elevation to a scale approximating that of FIG. 1 illustrating somewhat diagrammatically how the apparatus is used to unload a drawer one level above the bottom in the left bay thereof;

FIG. 12 is a view similar to FIG. 11 and to the same scale showing a further step in the unloading operation; and, FIG. 13 is a fragmentary front end elevation to the same scale as FIGS. 11 and 12 showing a three rack assembly, the two outboard racks having no elevator and with the elevator of the middle rack of the three being used to service both sides of the latter along with the adjacent bay of both outboard racks.

Referring next to the drawings for a detailed description of the present invention and, initially, to FIGS. 1–5 for this purpose, reference numeral 10 has been chosen to broadly designate the improved steel racking apparatus in its entirety while numerals 12, 14 and 16 have been employed to similarly designate the rack, elevator and hoist mechanism therefor, respectively. For purposes of the present description, the apparatus will be described in relation to an operator standing in the elevator cage 18 facing the rack 12. Thus, the end of the rack immediately in front of the operator will be the front end 20 thereof and the side of the rack on his left will be the left side 22 while that on his right will be the right side 24, the latter designation having been used in FIGS. 11, 12 and 13. While on this subject, reference to FIG. 13 will reveal three racks arranged side-by-side in spaced parallel relation. The middle rack 12M of the three carries the elevator while those outboard racks on either side thereof do not. The rack on the left side of the middle one has been designated rack 12L while that on the right has been similarly designated 12R. Appropriately, their right and left sides along with their front ends carry the corresponding letter designation M, L or R as shown. Thus, when the term "adjacent bays" is used in connection with FIG. 13, it is intended to mean left side 22R of the right-hand rack 12L. As will be seen, single elevator cage 18 of middle rack 12M is used to service both bays of the middle rack and the adjacent bays of the outboard racks.

Now, while rack 12 forms an integral part of the present invention, its construction apart from minor modifications is essentially that which is shown and described in assignee's U.S. Pat. No. 3,708,074 issued Jan. 2, 1973. This is not to say that the rack forming the subject matter of the aforesaid patent is the only one that can be used with the steel racking apparatus of the present invention because this is not the case. Instead, this patented rack is but one of many which could be adopted for use in accordance with the teaching found herein. Nevertheless, the previously mentioned patent provides an excellent detailed description of just how one such rack is constructed and is operated thus making it unnecessary to repeat these details again here. As far as essentials are concerned, any rack having some sort of pull-out drawer-like storage compartments or receptacles arranged one above the other in tiers and preferably duplicated in two bays on opposite sides thereof that are independently actuatable from the same end will suffice for purposes of the present invention. The drawer-like receptacles 26 of the racks illustrated are unique in that they are open on both sides as well as at the top. Moreover, they have no bottoms as such term is usually used, the drawers being defined by two or more transversely-spaced parallel cradles 28, each of which has an upwardly opening generally U-shaped configuration revealed to some extent in FIGS. 1, 2, 11 and 12. Manually operated drawer actuators 30 are provided at each level or tier in both of the front cornerposts 32, those in the right cornerpost 32R being operative upon actuation to open and close the receptacles of the right-hand bay while those on left cornerpost 32L control the receptacles of the left bay.

FIGS. 3, 5 and 7 to which reference will now be made show most clearly the cornerposts 32L and 32R on the front end 20 of the rack constitute vertically disposed transversely-spaced parallel rails cooperating with one another to define a track up and down which the cage-carrying frame that has been broadly designated by reference numeral 34 rides. This cage-carrying frame includes upper and lower rails 36U and 36L, respectfully, extending horizontally all the way across the front end of the rack in vertically spaced parallel relation. Vertically disposed sideplates 38 connect the adjacent ends of the rails 36U and 36L together and project rearwardly therefrom alongside the uprights in spaced relation thereto as revealed in FIG. 5. In the particular form shown, these sideplates are formed in two parts by two angle irons arranged with one pair of their flanges 38C in coplanar relation and the other pair 38P in spaced parallel relation so as to receive a pair of rollers 40 therebetween. Rollers 40 are mounted for rotation on axles 42 extending rearwardly and horizontally. The peripheral edges of these rollers ride along the right and left faces of uprights 32R and 32L, respectively, so as to keep the cage-carrying frame 34 from tilting about a horizontal axis extending from the front to the rear of the rack. Coplanar flanges 38C each carry a vertically spaced pair of parallel stubshafts 44 upon which rollers 46 are journalled in position to ride along the front and rear faces of the rail-forming cornerposts. These set of rollers 46 cooperate with one another and with their respective rails to keep the cage-carrying frame from moving toward and away from the rack as well as tilting relative thereto about a horizontal axis extending along in front thereof.

Cage-carrying frame 34 merely rides up and down the front end of the rack in response to actuation of the hoist mechanism 16 which will be described next in connection with FIGS. 1-5, inclusive, and 7 to which reference will next be made. Located at the base of the rack behind the front end thereof is a reversible gear motor 48 which constitutes the main elevator drive. Its gear box 50 includes a double-ended output shaft 52, both ends of which are fitted with drive sprockets 54 as shown in FIG. 3. A horizontally disposed shaft 56 is journalled in the top of the rack and it carries idler sprockets 58 which are vertically aligned with sprockets 54 on the motor shaft. A pair of sprocket chains 60 have one of the free ends 62 thereof attached to a counterweight 64 preparatory to being reaved in side-by-side parallel relation over the top of idler sprockets 58. These chains are then run down in front of the counterweight, around the drive sprockets 54 and back up again to a point of termination on the underside of the counterweight. In the particular form shown, the radius of the drive sprockets 54 is such that the front run 66 of the chains will not clear the counterweight, therefore, a couple of additional idler sprockets 68 are shown mounted on brackets 70 in position to hold the front run of the chain out away from the counterweight. Obviously, such a feature was included to merely meet the requirements of this particular rigging and it could easily be eliminated.

The sole function of gear motor 48 is to raise and lower counterweight 64, whereas, the latter element is responsible for raising and lowering the cage-carrying frame 34 and cage 18 associated therewith. This is accomplished by two cables 72 which interconnect the counterweight 64 and cage-carrying frame 34 through a system of pulleys. From points of attachment 74 located on opposite sides of the counterweight, cables 72 are reaved upward along the outside of the sprocket chains 60, over pulleys 76 in the top mid-section of the rack, laterally in opposite directions along the top of the rack and slightly forwardly to pulleys 78 on the upper outside corners thereof, down along the cornerposts 32 to points of attachment 80 (FIG. 7) on the back of the cage-carrying frame, on down and over pulleys 82 in the lower outside corners of the rack, back toward the center and in again along the bottom of the rack, and up again around pulleys 84 to points of termination 86 on the counterweight again. Thus, a pair of what, for all practical purposes, constitute endless cables are reaved between the counterweight and the opposite sides of the cage-carrying frame in such a way that when the counterweight is pulled down, the frame rises and vice versa. While the use of the counterweights to raise and lower elevators is not uncommon, the feature is believed to be novel whereby the counterweight is centered between the sides of the rack to ride up and down behind centerpost 88 thereof while providing the common counterbalance for the rear outside edges of the cage-carrying frame thus stabilizing the latter under conditions of unbalanced loading. Unfortunately, raising and lowering the cage-carrying frame while the cage is shifted to one side or the other instead of being centered therein is common practice among the operators and provision must be made for operating the apparatus under these conditions without derailment or even having the frame bind if the safety of the personnel is to be assured. Such is accomplished with the instant rigging because the frame is lifted and lowered by its rear outside edges. The net effect of an unbalanced load is to try and tilt the counterweight, yet, the latter is firmly held in place against such rotation by the common drive shaft, sprockets and chains.

Looking briefly at FIGS. 5 and 7, it will be seen that the terminations 80 comprise ordinary U bolts which permit each side of the frame 34 to be adjusted independently of the other to maintain it level. Elements 90 are merely spacers which hold those portions of the cables extending above and below the points of attachment 80 away from the frame and in proper alignment with the grooves in pulleys 78 and 82, both of which are offset rearwardly to the positions where the brackets 92 mounting same are fastened to the upper and lower crossframe elements 94 and 96, respectively, of the rack. No useful purpose would be served by going into detail concerning the mounting of the various pulleys because it is well within the skill of the ordinary artisan.

Looking next at FIGS. 1, 2, 3, 5 and 6, and especially FIG. 6, the control mechanism for the hoist 16 will be set forth in detail. A shaft 98 having a polygonal cross section is mounted for limited rotational movement midway between the sides of the front end 20 of the rack so as to extend vertically behind cage-carrying frame 34 but in position to be reached by an operator standing in cage 18. A suitable journal 100 for shaft 98 is provided at the top of the rack while the lower end thereof is received and retained in coupling 102 resting on grommet 104 atop the control box 106. Inside the control box is a motor control switch 108 having a switch actuator 110 operatively coupled to shaft 98 through coupling 102. Rotation of switch actuator 108 in one direction is effective to operate the gear motor 48 in a direction to raise the cage while rotation thereof in the opposite direction lowers same. A handle 110 having an aperture 112 therein shaped and sized to loosely receive shaft 98 while, at the same time, providing means for turning same is mounted on the latter for vertical sliding movement.

With particular reference to FIG. 6, it will be seen that a bracket 114 is attached to the rear of cage-carrying frame 34 for movement therewith up and down along shaft 98. This bracket includes a portion 116 defininm forwardly-opening channel 118 having vertically aligned oversized apertures 120 therein sized to loosely receive shaft 98 for relative rotational movement. The parallel flanges 122 and 124 bordering channel 118 bracket the portion of handle 110 on shaft 98 and function upon movement of the cage-carrying frame to carry the handle along with the latter. Thus, the operator within the cage has a remote switch actuator available to control the hoist mechanism at whatever level the cage happens to be. Moreover, such a set up eliminates the need for power cables running up and down with the cage.

Turning the attention next to FIGS. 1, 2, 3 and 6–10, inclusive, the manner in which the cage 18 is secured to the cage-carrying frame 34 for relative transverse movement will be set forth in detail. The cage itself is of conventional construction having a floor 126 bordered on all sides by a fence 128. A hinged gate 130 of conventional design provides for ingress and egress from the cage.

A self-actuating gate latch 132 is operative to latch the gate closed whenever the cage is above ground level. It consists of an L-shaped member pivotally attached to the cage adjacent the lower corner of the gate opposite the hinges 134. As shown most clearly in FIG. 2, the L-shaped member includes a long leg 136 and a short leg 138 with the pivot pin 140 being located at the junction therebetween. A stop 142 is provided on the gate in position to engage the short leg and stop it in the latched position illustrated whenever the cage leaves the ground and the weight of the long leg acts to pivot it into this position. Obviously, when the cage is on the ground as shown in FIG. 13, long leg 136 will be lifted up into horizontal position thus rotating the short leg 138 into a vertical position unlatching the gate.

The upper rail 36U of the cage-carrying frame will be seen to include upper and lower parallel horizontal surfaces 144U and 144L along which upper and lower rollers 146U and 146L roll. These rollers are journalled for rotation on stubshafts 148 attached to frame member 150 that extends along the back of the cage adjacent the top of the fence. Horizontally spaced pairs of these rollers 146 cooperate with one another and rail 36U to guide the cage during its horizontal excursion from side-to-side of the cage carrying frame 34 and also to keep it from tilting.

In FIG. 9 it will be seen that a roller 152 is journalled for rotation on a vertical stubshaft 148 fastened to the horizontal flange 154 of cage frame member 156 that extends along the bottom rear edge thereof. A pair of these rollers 152 are provided, one to the left of the center of the cage and the second to the right thereof. Both roll along the front facing surface 158 of lower rail 36L of the cage-carrying frame.

At this point it should be mentioned that the rollers 146 and 152 along with rollers 160 that ride along the rear face 162 of upper rail 36U, also are positioned somewhat more than a third of the way in toward the center of the cage from the right and left sides thereof as shown in FIG. 5. This is essential so that these rollers do not leave their respective rails when the cage is positioned in one or the other of its laterally offset positions, the left offset position having been shown in FIGS. 1 and 2 while the right offset one has been shown in the diagram of FIG. 13.

In order to latch the cage in selected centered or laterally offset positions, upper rail member 36U is provided with a row of horizontally aligned apertures 164 into which spring biased latch pin 166 is positioned. The operator merely pulls the latch pin 166 toward him overcoming the bias exerted thereon by compression spring 168 (FIG. 6) to release the cage for horizontal movement along its frame. Stops 170 are, of course, provided on the upper rail 36U in position to engage the rollers 146 and limit the excursion of the cage relative to its frame. The location of these stops is a matter of choice because they could obviously be placed elsewhere and still perform the same function.

Next, with reference to FIGS. 11, 12 and 13, the use of the elevator in combination with the single rack upon which it is mounted will be described. First of all, since the height of the cage is such that when resting on the ground as in FIG. 13, it covers up the lower drawer actuators 30, it must be moved aside to expose same. In the particular form shown, the actuators for the three lowest tiers on both sides of the rack are covered by the cage in centered position, therefore, to gain access to those on the left, the cage must be moved to the right into the full line position shown. Conversely, to service the three lower tiers on the right, it must be shifted into the phantom line position shown in FIG. 13. Of course, the operator will be standing on the ground while using these lower tiers as the elevator is not required.

To service the upper tiers, specifically, those located higher than the operator can reach, the elevator 14 is used. First, the operator takes the cage up to the desired level and, contrary to what takes place on the lowermost two tiers, he moves it to the same side of the rack where the drawer-like receptacle is located that he wishes to load or unload. It should be mentioned that the operator has with him in the cage a so-called "pendant control" for a double hook crane 172 positionable in the aisle 174 between racks. Once the cage has been shifted and latched in position, he takes his hand crank (not shown) and places it on the appropriate drawer actuator 30 turning it in the direction to open the receptacle. Next, he slips the sling 176R of the remote trolley of the two (not shown) over the near end of the steel 180 he wishes to move as shown in FIG. 11. Then, by lifting up the near end as shown, he can slip the sling 176N of the near trolley over the near end and lift the load high enough to slacken sling 176R, whereupon, it can be moved farther along toward the remote end of the load. Repeating this operation will ultimately place the slings where they will lift the load free of its receptacle, whereupon, the operator returns the cage to the ground and "walks" the load to its destination.

Finally, with reference to FIG. 13, it will be seen how the elevator 18 on the center 20M of three racks 20L, 20M and 20R can be used to service a total of four bays 24L, 22M, 24M and 22R. By shifting the cage into the full line position shown, the operator can reach over and actuate any of the receptacles in bay 22R of rack 20R just as easily as those in bay 24M of the center rack 20M. The same is true, of course, of the receptacles in bay 24L of rack 20L when the cage is shifted into the phantom line position on the left. Bay 22L, will, obviously, be worked from an elevator located on the next rack to the left of rack 20L (not shown). Thus, only half the racks have to be equipped with elevators.

What is claimed is:

1. The apparatus for racking steel and the like which comprises: a first two sided rack having a front end with spaced parallel rail-forming uprights defining a vertical track, a plurality of openable open topped drawer-like receptacles arranged one above the other in tiered relation on at least one side thereof, and means accessible at the front end on the side thereof having said receptacles for independently actuating the latter between open and closed positions; elevator means including a cage-carrying frame secured to said rail-forming uprights for vertical movement along the track defined thereby, and a fence enclosed platform defining an operator's cage-carrying frame for vertical movement therewith and for independent transverse movement in relation thereto from a centered position in front of the rack to at least one offset position shifted to the side of center; and, hoist means operatively connected to the cage-carrying frame for raising and lowering the elevator means.

2. The apparatus as set forth in claim 1 wherein the cage is mounted on the cage-carrying frame for transverse movement into offset positions shifted to either side of center, said cage when positioned at ground level in the offset position shifted to the side thereof opposite the side in which the drawer-like receptacles are located being effective to expose the actuators therefor to an operator standing on the ground, and said cage when offset to the same side of the rack as said drawer-like receptacles locating an operator therein in position to both actuate and observe at least one tier of the latter.

3. The apparatus as set forth in claim 1 which includes a second rack located in spaced relation alongside the first having a tier of drawer-like receptacles opening toward the latter controllable from the front end thereof; and in which the cage of the elevator means of the first rack when offset toward said second rack is positioned such that an operator therein can actuate and observe the tier of receptacles of said second rack adjacent thereto.

4. The apparatus as set forth in claim 1 in which: vertically spaced rollers are provided on the cage-carrying frame positioned to engage the rail-forming upright and prevent relative tiltable movement between said rack and elevator means while permitting relative vertical rolling movement therebetween.

5. The apparatus as set forth in claim 1 in which: said cage-carrying frame and cage include mutually interengaged rollers and rails cooperating with one another to permit relative transverse rolling movement therebetween without tilting.

6. The apparatus as set forth in claim 1 in which: the hoist means includes a control therefor operable by an operator in the cage.

7. The apparatus as set forth in claim 1 in which: both sides of the rack contain tiers of drawer-like receptacles; and, in which the cage is movable from a centered position to offset positions wherein a portion thereof projects laterally beyond the adjacent side thereof in overhanging relation.

8. The apparatus as set forth in claim 1 in which: latch means interconnect the cage and cage-carrying frame therefor operative upon actuation to releasably latch said cage in centered as well as selected offset positions.

9. The apparatus as set forth in claim 1 in which: stop means are carried by the cage and cage-carrying frame positioned and adapted to limit the transverse excursion of the former along the latter in both directions.

10. The apparatus as set forth in claim 1 in which: the hoist mechanism includes a reversible drive means, a vertically disposed endless loop power transfer means operatively connected to said reversible drive means extending up the front of the rack approximately midway between the sides thereof, a counterweight sized to counterbalance the elevator means secured to said endless loop power transfer means, and a pair of cable and pulley systems reaved between the counterweight and opposite sides of the cage-carrying frame operative to move the latter in the direction opposite to that in which the counterweight is moving upon movement of the latter by the drive means, said cable and pulley systems each including at least one pulley mounted at the front of the rack in the upper outside corner thereof and separate cables reaved from the counterweight up and over each of said pulleys and down along the sides of the rack to the cage-carrying frame.

11. The apparatus as set forth in claim 3 which includes a third rack positioned in spaced relation alongside the first on the opposite side thereof from said second rack, said third rack having a tier of drawer-like receptacles opening toward said first rack and operative from the same end thereof as the receptacles of the latter; and, in which the cage of the elevator means of said first rack when offset toward said third rack is positioned such that an operator therein can actuate and observe the tier of receptacles of said third rack adjacent thereto.

12. The apparatus as set forth in claim 4 in which vertically spaced rollers engage the outside of each of said rail-forming uprights while other similarly spaced pairs thereof engage same both front and rear.

13. The apparatus as set forth in claim 5 in which the cage-carrying frame includes upper and lower horizontal rails extending transversely thereof in vertically spaced parallel relation to one another; and, in which the cage carries a first pair of transversely spaced rollers positioned and adapted to roll along the top of the upper horizontal rail, a second pair of transversely spaced rollers positioned and adapted to roll along the rear of the latter, and a third pair of transversely spaced rollers positioned and adapted to roll along the front of the lower horizontal rail.

14. The apparatus as set forth in claim 6 in which: said hoist control includes a reversing switch positioned at the base of the rack in the front end thereof, an actuator for said switch operative to actuate same upon limited rotational movement, said switch actuator extending vertically along the front of the rack substantially the full height thereof, handle-forming means effective to rotate said actuator mounted thereon for vertical slidable movement, and bracket means interconnecting said cage-carrying means and handle-forming means operative to raise and lower the latter with the elevator means.

15. The apparatus as set forth in claim 10 in which: both cable and pulley systems include a second pulley mounted in the front of the rack for rotational movement in the lower outside corner thereof and a second cable reaved from the cage-carrying frame down the side of the rack and around said second pulley to the counterweight, said front and second pulleys and first and second cables of each system cooperating with one another to produce an endless loop subassembly including the counterweight and one side of the cage carrying frame, and said subassemblies cooperating with one another to maintain the elevator means in a stable and level condition even when the cage thereof is shifted into one of its offset positions.

* * * * *